United States Patent [19]

Jenkins, Jr.

[11] Patent Number: 5,899,993
[45] Date of Patent: *May 4, 1999

[54] METHOD AND APPARATUS FOR ACHIEVING AN ENFORCED AND VALID CONSTRAINT STATE

[75] Inventor: Robert J. Jenkins, Jr., Foster City, Calif.

[73] Assignee: Oracle Corporation, Redwood Shores, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/694,350

[22] Filed: Aug. 7, 1996

[51] Int. Cl.$^6$ .................................................. G06F 17/30
[52] U.S. Cl. .................................. 707/9; 707/10; 707/104
[58] Field of Search .............................. 707/100, 1, 201, 707/8, 10, 101, 104, 9; 235/492

[56] References Cited

U.S. PATENT DOCUMENTS

| | | | |
|---|---|---|---|
| 5,029,233 | 7/1991 | Fujisaki | 382/13 |
| 5,133,068 | 7/1992 | Crus et al. | 707/100 |
| 5,226,158 | 7/1993 | Horn et al. | 707/201 |
| 5,303,368 | 4/1994 | Kotaki | 707/8 |
| 5,386,557 | 1/1995 | Boykin et al. | 707/1 |
| 5,446,652 | 8/1995 | Peterson et al. | 364/578 |
| 5,485,607 | 1/1996 | Lomet et al. | 707/8 |
| 5,517,014 | 5/1996 | Iijima | 235/492 |
| 5,546,579 | 8/1996 | Josten et al. | 707/8 |
| 5,551,046 | 8/1996 | Mohan et al. | 707/8 |
| 5,577,231 | 11/1996 | Scalzi et al. | 395/500 |
| 5,677,997 | 10/1997 | Talatik | 707/10 |
| 5,758,351 | 5/1998 | Gibson et al. | 707/104 |

OTHER PUBLICATIONS

Robert Jenkins, *Constraints and Oracle Server*, Oracle Magazine Interactive, May 7, 1996.

Bruce M. Horowitz, *A Run–Time Execution Model for Referential Integrity Maintenance*.

Roberta J. Cochrane, Hamid Pirahesh, Nelson Mattos, *Integrating Triggers and Declarative Constraints in SQL Database Systems*, Proceedings of the 22$^{nd}$ International Conference on Very Large Data Bases, Bombay, India, Sep. 1996.

L. Gallagher, *X3H2 SQL Change Proposal X3H2–86–164*, Nov. 24, 1986, pp. 1–17.

*IBM BookManager BookServer* Copyright 1989, 1995 IBM Corporation; Littp://TS.adm.ilstu.edu:80/cgi–bin/bookmgr./cmd/Shelves/DSNSHOB4 (IBM DB2) (Mar. 24, 1997).

*Primary Examiner*—Thomas G. Black
*Assistant Examiner*—Frantz Coby
*Attorney, Agent, or Firm*—McDermott, Will & Emery

[57] ABSTRACT

A method and apparatus are disclosed for enabling a constraint without prohibiting updates to the constrained data during the validation portion of the enablement process. A constraint is first enforced. While the constraint is being enforced, the pre-existing data are inspected to determine whether the constraint is valid. Because the constraint is in force for all changes to the data during the validation process, the constraint will be enabled if the pre-existing data conforms with the constraint. A serialization value is stored in the constraint definition. Whenever the constraint definition is changed, the serialization value is changed. The serialization value of a constraint definition is recorded before validating the constraint. After validating the constraint, the serialization value in the constraint definition is compared to the recorded serialization value to determine whether the constraint definition was changed during the validation process.

22 Claims, 3 Drawing Sheets

METHOD AND APPARATUS FOR ACHIEVING AN ENFORCED AND VALID CONSTRAINT STATE

FIELD OF THE INVENTION

The present invention relates to database systems, and more specifically, to a method and apparatus for achieving an enforced and valid constraint state when a constraint is specified for a pre-existing body of data.

TERMINOLOGY

The following terms are used in the description that follows hereafter to describe embodiments of the present invention:

"Asserting" a condition means to guarantee that the condition is true after the assertion. A condition may be asserted by performing some action that guarantees that the condition will be true. A condition may also be asserted by testing if the condition is true and, if the condition is not currently true, waiting for some time period and then re-testing to see if the condition has become true. This process of testing and waiting may be repeated many times. If the condition remains not true, then the parent operation is aborted. Under some circumstances, it is possible to simplify the assertion operation to testing the condition once and aborting if the condition is not true. In addition, asserting a condition may involve no test at all if it is known a priori that the condition is true. "Locking" a resource means trying to lock the resource and waiting if the lock is not obtained. This process may be repeated many times. If the lock has not been obtained after a predetermined number of attempts, then the parent operation is aborted.

The "constrained data" for a constraint is all of the data to which a constraint applies.

A constraint is "valid" if the constrained data conform to the constraint. If any data item in the constrained data violates the constraint, then the constraint is invalid. For example, constraint CNST1 is valid if all non-NULL values in COL1 fall in range RNG1, and is invalid if any non-NULL value in column COL1 falls outside of range RNG1. "Validating" a constraint means performing an operation that asserts that the constraint is valid. For example, constraint CNST1 may be validated by determining that all non-NULL values in COL1 fall in range RNG1 by inspecting all non-NULL values in COL1.

A "validated" constraint is a constraint that is known to be valid. A constraint that has not been validated may or may not be valid.

An "enforced" constraint triggers a process upon modification, insert, update, and delete of constrained data which guarantees that the constraint remains valid if the constrained data was already valid. For example, the database system would enforce constraint CNST1 by preventing a value within the column COL1 to be changed to a value that falls outside range RNG1, and by preventing new data that falls outside range RNG1 from being inserted into the column COL1.

A "constraint definition" is data that represents the true state of a constraint, including an identifier for the constraint, whether the constraint is enforced, whether the constraint is valid, and optionally a serialization field whose value is increased whenever the constraint is modified.

A constraint is "disabled" if the constraint is not enforced and not validated.

A constraint is "enabled" if the constraint is both enforced and validated.

BACKGROUND OF THE INVENTION

In database systems, a rule that limits the values that a particular set of data can hold is referred to as a constraint. For example, a constraint CNST1 may specify that all data in a column COL1 of a particular table must fall within a particular range RNG1. Standard types of constraints include not null, check, unique key, primary key, and foreign key constraints. These constraints are defined in the ANSI SQL '92 standard described in ISO/IEC 9075: 1992, Database Language SQL, Jul. 30, 1992.

Often, it is desirable to enable a constraint for a pre-existing body of data. Because the constraint was not enforced during the entry of the pre-existing body of data, some or all of the pre-existing data may violate the constraint. Therefore, the constraint is not enabled until the constraint has been validated.

Existing database systems enable a constraint by locking all constrained data, validating the constraint, and then unlocking the constrained data and enforcing the constraint on any future changes. FIG. 1 illustrates the conventional approach to enabling a constraint in greater detail.

Referring to FIG. 1, at step 100 the process that has been assigned the task of enabling the constraint (the "enablement process") obtains an exclusive lock on the constraint definition. Existing database systems typically wait up to some predetermined amount of time for the exclusive lock before aborting the operation. Obtaining an exclusive lock effectively prevents any other processes from reading or changing the constraint definition. At step 102, the enablement process obtains shared locks on the constrained data. This allows the enablement process to read the constrained data and prevents other processes from changing the constrained data.

At step 104, the enablement process validates the constraint by checking all of the constrained data for conformity with the constraint. If any data item in the constrained data violates the rule specified in the constraint, then the constraint is not valid and control proceeds from step 106 to step 108. At step 108, an error is generated and the enablement process is aborted. When the constraint is invalid, invalid data is optionally placed into an exceptions table before the enablement process is aborted.

If all of the constrained data conforms to the rule specified in the constraint, the constraint is valid and control proceeds from step 106 to step 110. At step 110, the enablement process does anything required to allow enforcement of the constraint. This may include, for example creating an index for a unique key constraint.

At step 112, the definition of the constraint is updated to record that the constraint is enabled. At step 114, the change to the constraint definition is committed. The constraint is not enabled unless this final commit occurs. At step 116, the locks on the constrained data and the constraint definition are released and the database system begins enforcing the constraint. Typically, steps 114 and 116 are performed as a single atomic operation.

Different database systems may employ slight variations of the constraint enablement technique described above. For example, the enablement process may obtain exclusive locks rather than share locks on the constrained data itself. Also, the enablement process may obtain an exclusive lock on the constraint definition after validating the constraint, rather than before validating the constraint.

A significant disadvantage of the prior art constraint enablement techniques is that inserts, updates, and deletes are disallowed on the constrained data while a constraint is being validated. If the existing body of data is large, validating a constraint may take hours. Such delays are unacceptable in many situations. For example, if the database is being used in a flight reservation system, travelers will not want to wait hours for their reservations to be confirmed.

One attempt to avoid the delay inherent in the conventional constraint enablement process allows users to specify constraints that are only enforced. A disabled constraint can become an enforced-only constraint by (1) obtaining an exclusive lock on the constraint definition, (2) doing anything required to allow enforcement of the constraint, (3) updating the constraint definition to record that the constraint is enforced but not enabled, (4) committing the change to the constraint definition, and (5) enforcing the constraint after the commit.

After an enforced-only constraint has been created, the user will know that all changes made and all data inserted after the creation of the constraint will conform to the constraint. However, the constraint is not actually validated. Therefore, the database engine has not proven that the data that existed before the creation of the constraint actually conforms to the constraint. Because some of the constrained data may actually violate an enforced-only constraint, enforced-only constraints have very limited utility. If the user requires an enforced-only constraint to be enabled, the user executes the enablement technique described above, thereby rendering the constrained data unavailable for modification by the user.

Based on the foregoing, it is clearly desirable to provide a mechanism for enabling constraints without making the constrained data unavailable for inserts, updates and deletes for an extended period of time.

SUMMARY OF THE INVENTION

A method and apparatus are provided for enabling a constraint without prohibiting updates to the constrained data during the validation portion of the enablement process. According to one aspect of the invention, a constraint is first enforced. After enforcement has started, the pre-existing data is inspected to determine whether the constraint is invalid. Because the constraint is in force for all changes to the data during the validation process, the constraint will be enabled if the pre-existing data conforms with the constraint.

According to one embodiment of the invention, the validation process performs validation by executing a single query in a database system that does not require the use of read locks. According to an alternative embodiment, the validation process performs validation by executing a series of queries in a database system that requires the use of read locks. After each query in the series is executed, the read locks held by the query are released. Consequently, the validation process requires read locks on only a portion of the constrained data at any given time.

According to an aspect of the invention, a serialization value is stored in the constraint definition. Whenever the constraint definition is changed, the serialization value is changed. The serialization value of a constraint is recorded before validating the constraint. After validating the constraint, the serialization value in the constraint definition is compared to the recorded serialization value to determine whether the constraint definition was changed during the validation process.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for enabling a constraint is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
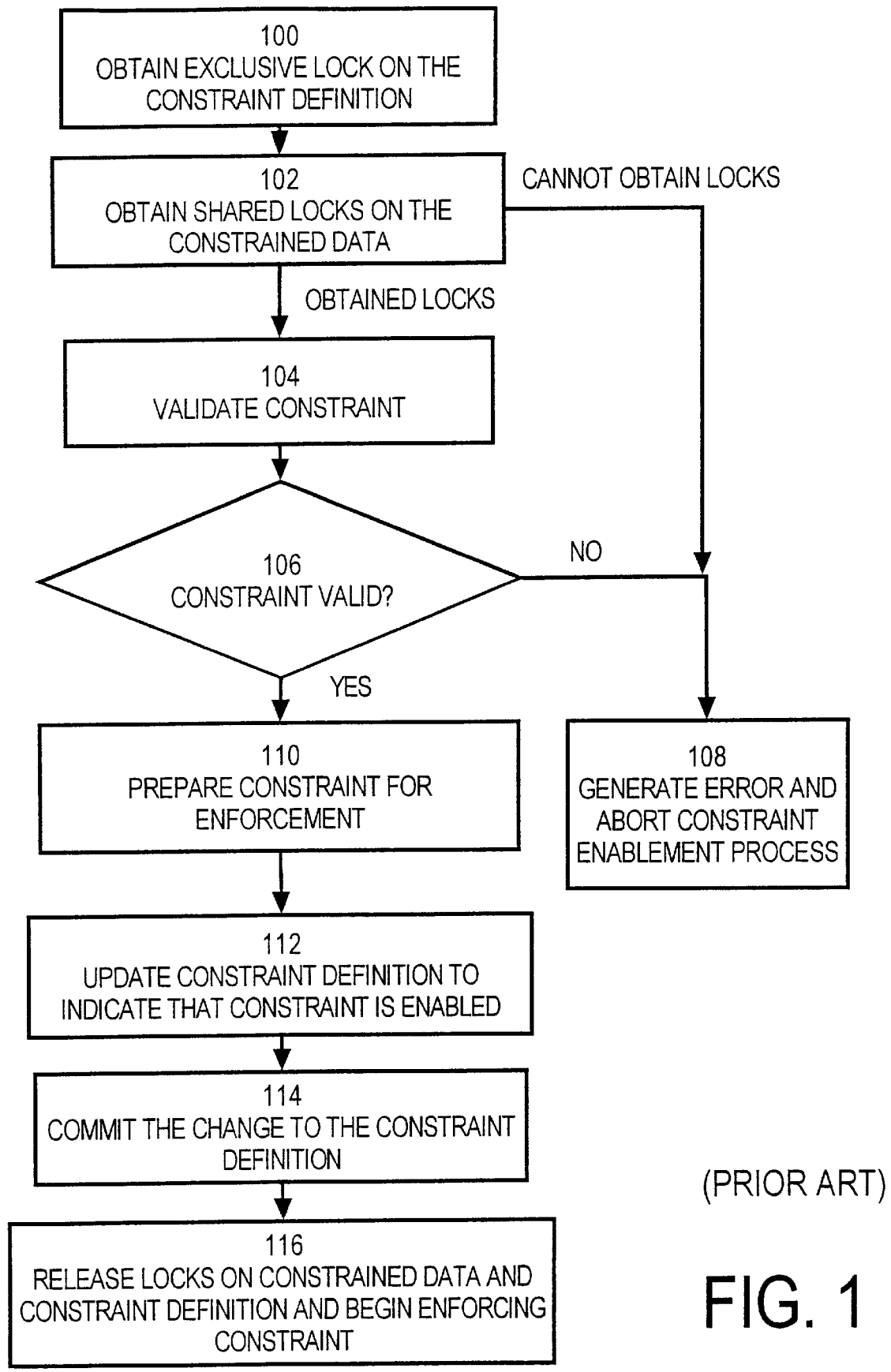
FIG. 1 is a flow chart illustrating a conventional technique for enabling a constraint.
Figure 2:
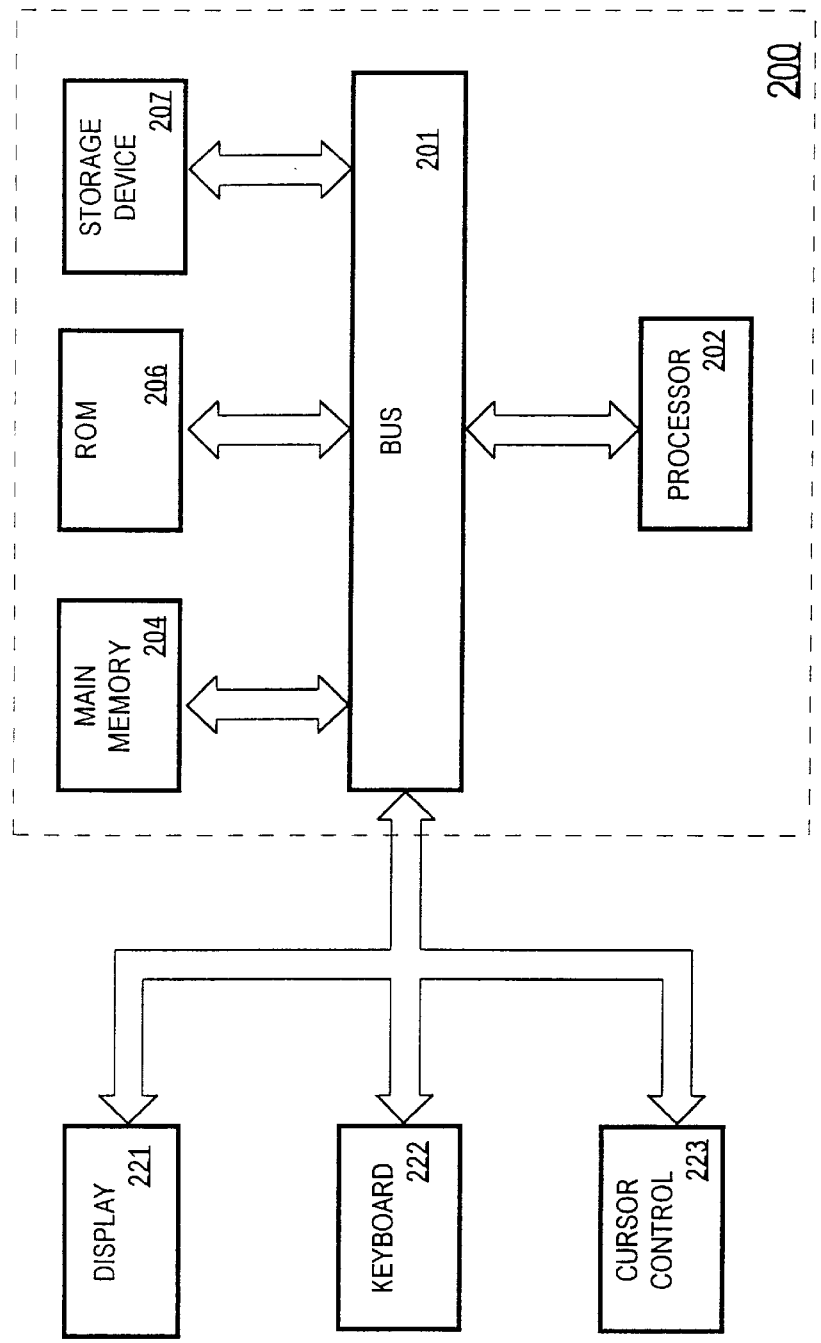
FIG. 2 is a block diagram of a computer system on which the present invention may be implemented.

Referring to FIG. 2, it is a block diagram of a computer system 200 upon which an embodiment of the present invention can be implemented. Computer system 200 includes a bus 201 or other communication mechanism for communicating information, and a processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202. Data storage device 207 is coupled to bus 201 for storing information and instructions.

A data storage device 207 such as a magnetic disk or optical disk and its corresponding disk drive can be coupled to computer system 200. Computer system 200 can also be coupled via bus 201 to a display device 221, such as a cathode ray tube (CRT), for displaying information to a computer user. An alphanumeric input device 222, including alphanumeric and other keys, is typically coupled to bus 201 for communicating information and command selections to processor 202. Another type of user input device is cursor control 223, such as a mouse, a trackball, or cursor direction keys for communicating direction information and command selections to processor 202 and for controlling cursor movement on display 221. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 222 wherein all interface is provided via the stylus as a writing instrument (like a pen) and the written text is interpreted using optical character recognition (OCR) techniques.

The present invention is related to the use of computer system 200 to enable constraints. According to one embodiment, the constraint enablement process is performed by computer system 200 in response to processor 202 executing sequences of instructions contained in memory 204. Such instructions may be read into memory 204 from another computer-readable medium, such as data storage device. Execution of the sequences of instructions contained in memory 204 causes processor 202 to perform the process steps that will be described hereafter. In alternative embodiments, hard-wired circuitry may be used in place of or in combination with software instructions to implement the present invention. Thus, the present invention is not limited to any specific combination of hardware circuitry and software.

FUNCTIONAL OVERVIEW

According to an embodiment of the invention, a technique is provided for enabling a constraint in a manner that does not lock the constrained data during validation. By first enforcing the constraint, then checking that all old constrained data satisfies the constraint, the constraint can be enabled without ever locking all of the constrained data. If the constraint was valid before the checking begins, and the constraint is enforced during the entire checking operation, then the constraint will still be valid once the checking has confirmed that all old data was valid.

Using the constraint enablement techniques described herein, the constrained data is not locked during constraint validation. In fact, enabling a constraint never requires the constrained data to be locked at all. This benefit is significant, since constraint validation can take many hours when a constraint applies to large amounts of data, and some applications (airline reservation systems, for example) cannot tolerate data being locked for more than a minute or so.

According to an embodiment of the invention, a constraint is enabled in two phases. During the first phase, the constraint moves from disabled to enforced. That is, the constraint definition is committed to the database and the database system begins enforcing the constraint on all updates, inserts and deletes that are made to the constrained data. During the second phase, the constraint moves from enforced to enabled. These phases shall be described in greater detail below with reference to FIG. 3.

Figure 3:
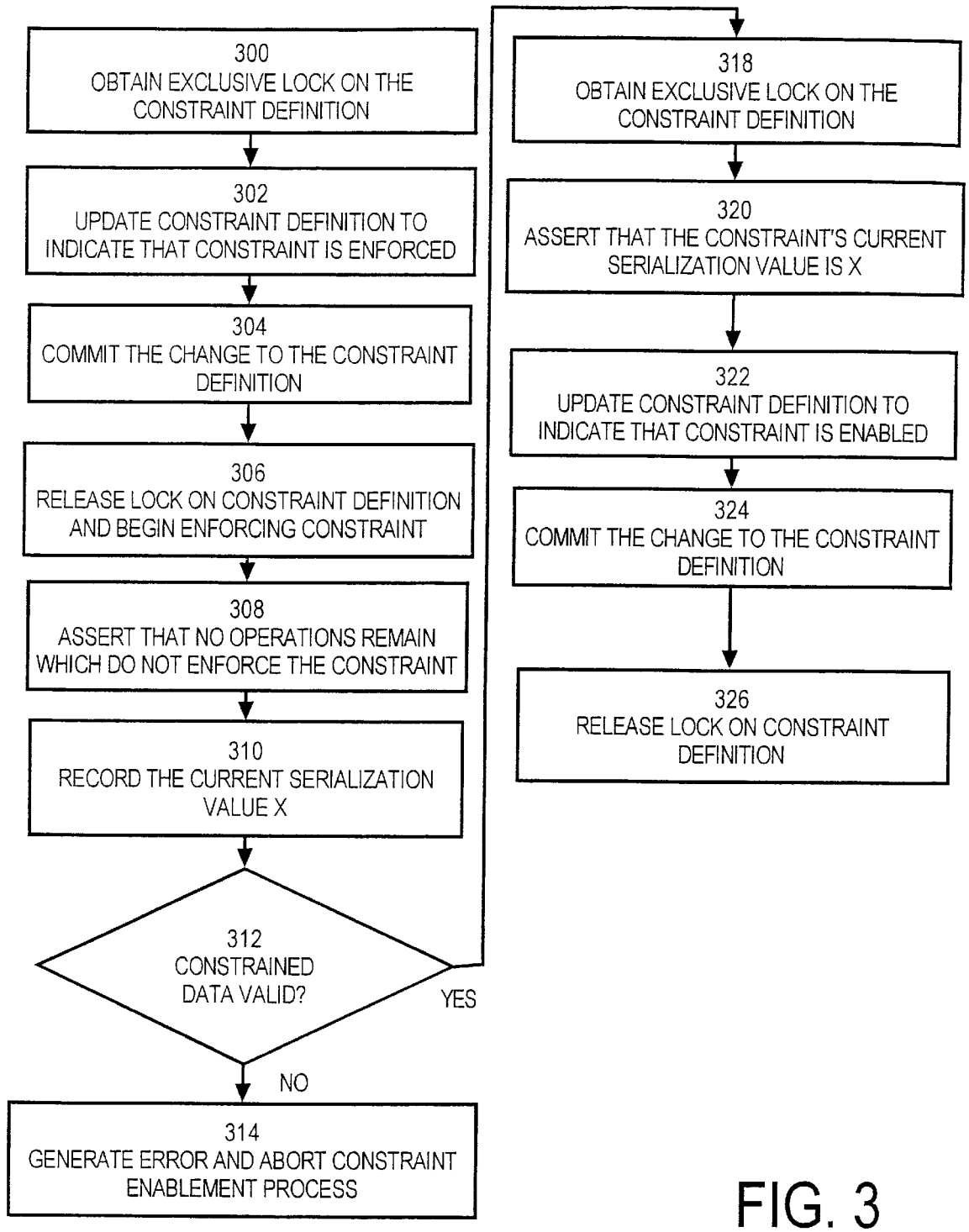
FIG. 3 is a flow chart illustrating a technique for enabling a constraint according to an embodiment of the invention.

Referring to FIG. 3, it is a flow chart illustrating the steps performed to enable a constraint according to an embodiment of the invention. At step 300, an exclusive lock is obtained on the constraint definition. In some database systems, exclusive locking a constraint definition disallows any operations that might use that constraint. In such systems, the constrained data is effectively locked while the constraint definition is locked. Consequently, all operations modifying the constrained data must either end before the constraint definition is updated or start after the change to the constraint definition is committed.

At step 302, the constraint definition is updated to indicate that the constraint is enforced. At step 304, the change to the constraint definition is committed. At step 306, the lock on the constraint definition is released and the database system begins enforcing the constraint. A constraint can be enforced in a variety of ways, a number of which are described in "A Run-Time Execution Model for Referential Integrity Maintenance", Bruce M. Horowitz, Proc. $8^{th}$ Int. Data Engineering conference, February 1992, and "Integrating Triggers and Declarative constraints in SQL Database Systems", Roberta J. Cochrane, to appear in Proc. 22 Int. conf. On Very Large Data Bases, September 1996.

When step 306 has been completed, users can see a constraint that is enforced but not validated. Anywhere a database system currently relies on constraints being valid, the database system should recognize that enforced constraints are not necessarily valid.

At step 308, the enablement process asserts that no operations remain which do not enforce the constraint. This includes asserting that any transactions on the constrained data have committed if they started before the constraint became enforced. The execution of this step may vary from implementation to implementation. For example, in systems that do not allow any operations to hold locks on constrained data while the constraint is exclusively locked, no operations which do not enforce the constraint will remain after step 300.

In systems that allow currently executing operations to continue executing while a constraint definition they depend on is exclusively locked by someone else, step 308 may involve waiting until no operations can modify the constrained data without enforcing the constraint. This step may introduce a necessary delay between enforcing a constraint and making the constraint enabled. However, execution of this step allows the validation process to assume that all concurrent operations have constraint enforcement turned on. Therefore, all new updates, inserts and deletes performed on the constrained data will conform to the constraint. Consequently, the enabling process never has to lock constrained data.

According to one embodiment of the invention, a constraint definition includes a serialization field. The serialization field of the constraint definition is initialized when the constraint is first created and increased when the constraint definition is changed due to enabling, disabling, enforcing, or validating the constraint. For example, when any of these events occur, the serialization value in the constraint definition may be updated based on a sequence number or the current time. At step 310, the enablement process records the current serialization value X of the constraint.

At step 312, the constraint is validated. During this step, all of the constrained data that has not been changed or inserted after the database system began enforcing the constraint is inspected. If any of the pre-existing constrained data violate the constraint, control passes to step 314. At step 314, an error is generated and the constraint enablement process is aborted. Prior to aborting the constraint enablement process, the database system may store an indication of which constrained data violated the constraint.

If all of the pre-existing constrained data conform to the constraint, then control passes from step 312 to step 318. At step 318, an exclusive lock is obtained on the constraint definition.

At step 320, the enablement process asserts that the current serialization value in the constraint definition is the same serialization value that was stored at step 310 before the validation process began. If no changes were made to the constraint definition while the pre-existing constrained data was being inspected, the current serialization value in the constraint definition will be equal to the serialization value stored at step 310. Otherwise, the constraint definition has been changed and the constraint may not have been enforced throughout validation.

At step 322, the constraint definition is updated to indicate that the constraint is enabled. At step 324, the change to the constraint definition is committed. At step 326, the lock on the constraint definition is released.

VALIDATION

Not null, check, unique key, primary key, and foreign key constraints are defined in terms of queries on the database which are required to return an empty result. A constraint can be validated by running the constraint's defining query and confirming that the result is empty. The actual validation procedure may vary from implementation to implementation. For example, the validation procedure may be different for database systems that do not require processes to obtain a shared lock before reading data than for database systems that require processes to obtain shared locks before reading data.

VALIDATION IN SYSTEMS WITHOUT READ LOCKS

A read lock on a data item prevents other processes from obtaining a write lock on the same data item. Similarly, a write lock on a data item prevents other processes from obtaining a read lock on the data item. When a process updates a data item, the process holds a write lock on the data item until the change is committed to the database. Thus, read locks are used to ensure that processes will not read changes that have not yet been committed to the database.

Some database systems do not require processes to obtain read locks on queried data because they provide alternative mechanisms to ensure that processes do not see uncommitted changes made by other processes. For example, version 7.1 of the Oracle Database Server allows queries to see "snapshots" of the database. A snapshot of the database contains all of the changes that were committed to the database as of a given time. If a data item has been updated since the snapshot associated with a reading process, the update is removed before the data item is supplied to the reading process.

If a database system does not require processes to obtain read locks on queried data, then a constraint may simply be validated by running the constraint's defining query and confirming that the query returns an empty result. Because the constrained data is not locked, users may insert, delete and update the constrained data while the validation process is being executed.

VALIDATION IN SYSTEMS WITH READ LOCKS

If a database requires read locks on queried data, then validation may be performed by issuing a set of queries to validate a constraint, where the union of those queries is equal to the result set of the defining query. Before each query is executed, share locks are obtained on the subset of the constrained data that corresponds to the query. After the query has run, the share locks are released, and share locks are obtained for the next query in the series. This approach locks very little data at any time, and no data would be locked for very long.

If the constraint was valid to start with, and the constraint is enforced throughout the validation process, and at the end of the validation process all remaining old data has been checked by some query, then the constraint has been validated.

There are many possible ways to divide validation queries into sets of queries. Examples of such sets of queries are given below. When the example needs a list of all rows in a table, these can be obtained by reading the table and not obtaining any locks. When the example needs a list of all values for a key, the list can be obtained by reading an index on the key without obtaining any locks. These reads will not see a consistent view of the table or index, but under these circumstances a consistent view is not necessary.

For a NOT NULL constraint on column "col" in table "tab", for each row in the table tab, let IDENT be a query predicate that identifies that row. The SQL query "select 1 from tab where col is null and IDENT;" would be in the set of queries.

For a CHECK constraint on tab.col with condition CHK, for each row in the table tab, let 'IDENT be a query predicate that identifies that row. The SQL query "select 1 from tab where (not CHK) and IDENT;" would be in the set of queries.

For a UNIQUE KEY constraint on (tab.col1, . . . tab.coln), for each value in (tab.col1, . . . tab.coln), let IDENT be a query predicate that identifies that value. The SQL query "select count(1) from tab where IDENT group by col, . . . coln having count(1)>1;" would be in the set of queries.

The set of queries for a PRIMARY KEY constraint is the set of queries for a UNIQUE KEY constraint on the same columns, plus the queries for NOT NULL constraints on each of those columns.

For a FOREIGN KEY constraint (child. col1, . . . child. coln) on PRMARY KEY (parent.col1, . . . parent.coln), for each value in (child.col1,..child.coln), let IDENT be a query predicate that identifies that value. The SQL query "select I from child where IDENT and (child.col1, . . . child.coln) not in (select parent.col1,..parent.coln from parent where parent.col1=child.col1 and . . . parent.coln=child. coln);" would be in the set of queries.

THE ENFORCED BUT NOT VALIDATED STATE

As mentioned above, while the validation process is in progress, constraints enter a state where they are enforced but not validated. Therefore, an enforced constraint is not guaranteed to be valid. A query optimizer that relies on the validity of constraints to produce correct results should assume that a constraint is invalid if it has not been validated.

For example, if null values are not stored in indexes, then it is proper to use a full index scan instead of a full table scan of those columns followed by a sort only if there is a validated NOT NULL constraint on the indexed columns. Similarly, an updatable join view that relies on a unique key being valid cannot be used until the unique key has been validated.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for enabling a constraint in a database management system, wherein said constraint applies to constrained data and wherein said constrained data includes pre-existing data that was in said database management system prior to creation of the constraint, the method comprising the steps of:

before validating the constraint relative to said pre-existing data, enforcing the constraint relative to newly initiated operations that involve said constrained data; and enabling the constraint while the constraint is being enforced relative to newly initiated operations;

wherein the step of enabling the constraint includes validating the constraint relative to said pre-existing data while the constraint is being enforced relative to the newly initiated operations.

2. The method of claim 1 further comprising the step of allowing a user to access the constrained data while performing the step of enabling the constraint.

3. The method of claim 2 further comprising the step of allowing the constrained data to be modified while performing the step of enabling the constraint.

4. The method of claim 1 wherein the step of enabling the constraint comprises the steps of:

asserting that no operations remain which do not enforce said constraint before validating said constraint; and after validating said constraint, performing the steps of
exclusive locking a constraint definition of said constraint;
asserting that said constraint definition has not changed since beginning the step of validating;
applying an update to said constraint definition to indicate that said constraint is enabled; and
committing the update.

5. The method of claim 4 further comprising the step of allowing the constrained data to be modified while said constraint is being validated.

6. The method of claim 5 further comprising the steps of:
updating a serialization value in said constraint definition whenever said constraint definition is updated; and
inspecting said serialization value in said constraint definition after validating said constraint to determine if said constraint definition changed during validation.

7. The method of claim 6 wherein the step of validating includes the steps of:
executing a single query which acquires no share locks, and
aborting if the single query indicates that the constraint is not valid.

8. The method of claim 6 wherein the step of validating includes the steps of:
formulating a set of queries which covers all the constrained data;
executing said set of queries, wherein the step of executing said set of queries includes the steps of
executing a first query in said set of queries,
after executing said first query, releasing locks obtained by said first query, and
after releasing locks obtained by said first query, executing a second query in said set of queries; and
asserting that no query in said set indicates that said constraint is invalid.

9. The method of claim 1 wherein the step of enabling includes validating the constraint by performing the steps of:
executing a single query which acquires no share locks, and
aborting if the single query indicates that the constraint is not valid.

10. The method of claim 1 wherein the step of enabling includes validating the constraint by performing the steps of:
formulating a set of queries which covers all the constrained data;
executing said set of queries, wherein the step of executing said set of queries includes the steps of
executing a first query in said set of queries,
after executing said first query, releasing locks obtained by said first query, and
after releasing locks obtained by said first query, executing a second query in said set of queries; and
asserting that no query in said set indicates that said constraint is invalid.

11. The method of claim 3 wherein the step of enabling includes validating by performing the steps of:
formulating a set of queries which covers all the constrained data;
executing said set of queries, wherein the step of executing said set of queries includes the steps of
executing a first query in said set of the queries,
after executing said first query, releasing locks obtained by said first query, and
after releasing locks obtained by said first query, executing a second query in said set of queries; and
asserting that no query in said set indicates that said constraint is invalid.

12. The method of claim 5 wherein the step of validating includes the steps of:
formulating a set of queries which covers all the constrained data;
executing said set of queries, wherein the step of executing said set of queries includes the steps of
executing a first query in said set of queries,
after executing said first query, releasing locks obtained by said first query, and
after releasing locks obtained by said first query, executing a second query in said set of queries; and
asserting that no query in said set indicates that said constraint is invalid.

13. The method of claim 3 further comprising the steps of:
locking the constraint before enforcing the constraint, wherein locking the constraint guarantees that no transaction is modifying the constrained data; and
unlocking the constraint before completing the step of enabling the constraint.

14. The method of claim 3 further comprising the steps of:
locking the constraint before enforcing the constraint, wherein locking the constraint does not guarantee that no transaction is modifying the constrained data;
before validating the constraint, performing the steps of
asserting that no operations which do not enforce the constraint have terminated; and
asserting that all transactions that might not enforce the constraint have committed.

15. The method of claim 5 further including the steps of:
locking the constraint before enforcing the constraint, wherein locking the constraint does not guarantee that no transaction is modifying the constrained data;
before validating the constraint, performing the steps of
asserting that no operations which do not enforce the constraint have terminated; and
asserting that all transactions that might not enforce the constraint have committed.

16. A computer system comprising:

one or more processors;

one or more memory devices; and sequences of instructions stored on said one or more memory devices;

wherein execution of said sequences of instructions by said one or more processors causes said one or more processors to enable a constraint on constrained data by performing the steps:

enforcing said constraint, relative to newly initiated operations involving said constrained data, before validating the constraint relative to pre-existing constrained data that was stored on said one or more memory devices prior to creation of said constraint, and enabling the constraint while the constraint is being enforced relative to the newly initiated operations, wherein said constrained data includes pre-existing data that was stored on said one or more memory devices prior to creation of said constraint.

17. The computer system of claim 16 wherein the one or more processors allow the constrained data to be modified while enabling the constraint.

18. The computer system of claim 16 wherein the one or more processors perform the steps of:

asserting that no operations remain which do not enforce said constraint before validating said constraint;

allowing the constrained data to be modified while said constraint is being validated, and after validating said constraint, performing the steps of exclusive locking a constraint definition of said constraint;

asserting that said constraint definition has not changed since beginning the step of validating;

applying an update to said constraint definition to indicate that said constraint is enabled; and committing the update.

19. A computer readable medium having stored thereon sequences of instructions for enabling a constraint in a database management system, wherein said constraint applies to constrained data and wherein said constrained data includes pre-existing data that was in said database management system prior to creation of the constraint, the sequences of instructions including sequences of instructions for performing the steps of:

before validating the constraint relative to said pre-existing data, enforcing the constraint relative to newly initiated operations that involve said constrained data; and enabling the constraint while the constraint is being enforced relative to newly initiated operations:

wherein the step of enabling the constaint includes validating the constraint relative to said pre-existing data while the constraint is being enforced relative to the newly initiated operations.

20. The computer readable medium of claim 19 further comprising sequences of instructions for performing the step of allowing the constrained data to be modified while performing the step of validating the constraint.

21. The computer readable medium of claim 19 further comprising sequences of instructions for performing the steps of:

asserting that no operations remain which do not enforce said constraint before validating said constraint;

after validating said constraint, performing the steps of exclusive locking a constraint definition of said constraint;

asserting that said constraint definition has not changed since beginning the step of validating;

applying an update to said constraint definition to indicate that said constraint is enabled; and committing the update.

22. The computer readable medium of claim 21 further comprising sequences of instructions for performing the step of allowing the constrained data to be modified while said constraint is being validated.

* * * * *